US008161398B2

(12) United States Patent  (10) Patent No.: US 8,161,398 B2
Cragun  (45) Date of Patent: Apr. 17, 2012

(54) ASSISTIVE GROUP SETTING MANAGEMENT IN A VIRTUAL WORLD

(75) Inventor: Brian J. Cragun, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 390 days.

(21) Appl. No.: 12/437,638

(22) Filed: May 8, 2009

(65) Prior Publication Data

US 2010/0287510 A1    Nov. 11, 2010

(51) Int. Cl.
  *G06F 3/048* (2006.01)
(52) U.S. Cl. ........................................ 715/757; 715/706
(58) Field of Classification Search .................. 345/427,
  345/473, 157, 418, 426; 715/757, 848, 706,
  715/201, 719, 723, 738, 747, 748, 830; 463/42
  See application file for complete search history.

(56) References Cited

U.S. PATENT DOCUMENTS

| | | | | |
|---|---|---|---|---|
| 5,880,731 A * | 3/1999 | Liles et al. | 715/758 |
| 5,907,328 A * | 5/1999 | Brush, II et al. | 715/863 |
| 5,923,330 A * | 7/1999 | Tarlton et al. | 345/419 |
| 6,023,270 A * | 2/2000 | Brush et al. | 715/741 |
| 6,037,914 A * | 3/2000 | Robinson | 345/7 |
| 6,057,828 A * | 5/2000 | Rosenberg et al. | 345/156 |
| 6,091,410 A * | 7/2000 | Lection et al. | 715/706 |
| 6,219,045 B1 * | 4/2001 | Leahy et al. | 715/757 |
| 6,229,533 B1 * | 5/2001 | Farmer et al. | 345/473 |
| 6,271,843 B1 * | 8/2001 | Lection et al. | 715/848 |
| 6,331,853 B1 * | 12/2001 | Miyashita | 345/427 |
| 6,366,285 B1 * | 4/2002 | Brush et al. | 345/473 |
| 6,437,771 B1 * | 8/2002 | Rosenberg et al. | 345/156 |
| 6,476,830 B1 * | 11/2002 | Farmer et al. | 715/769 |
| 7,181,690 B1 * | 2/2007 | Leahy et al. | 715/706 |
| 7,493,558 B2 * | 2/2009 | Leahy et al. | 715/704 |
| 7,564,469 B2 * | 7/2009 | Cohen | 345/632 |
| 2004/0128350 A1 * | 7/2004 | Topfl et al. | 709/204 |
| 2006/0119572 A1 * | 6/2006 | Lanier | 345/156 |
| 2007/0050716 A1 * | 3/2007 | Leahy et al. | 715/706 |
| 2007/0260984 A1 * | 11/2007 | Marks et al. | 715/706 |
| 2008/0022209 A1 * | 1/2008 | Lyle | 715/730 |
| 2008/0094417 A1 * | 4/2008 | Cohen | 345/632 |
| 2008/0172635 A1 * | 7/2008 | Ross et al. | 715/826 |
| 2009/0089685 A1 * | 4/2009 | Mordecai et al. | 715/757 |
| 2009/0144639 A1 * | 6/2009 | Nims et al. | 715/757 |
| 2009/0147003 A1 * | 6/2009 | Do et al. | 345/427 |
| 2009/0147008 A1 * | 6/2009 | Do et al. | 345/473 |
| 2009/0158151 A1 * | 6/2009 | Cheng et al. | 715/706 |
| 2009/0183071 A1 * | 7/2009 | Smith et al. | 715/706 |
| 2009/0249227 A1 * | 10/2009 | Clark et al. | 715/757 |
| 2009/0251457 A1 * | 10/2009 | Walker et al. | 345/418 |
| 2010/0031165 A1 * | 2/2010 | Lindquist | 715/757 |
| 2010/0048358 A1 * | 2/2010 | Tchao et al. | 482/9 |
| 2010/0050088 A1 * | 2/2010 | Neustaedter et al. | 715/745 |
| 2010/0060662 A1 * | 3/2010 | Law | 345/629 |

(Continued)

*Primary Examiner* — Doon Chow
*Assistant Examiner* — David Choi
(74) *Attorney, Agent, or Firm* — Patterson & Sheridan LLP (57) ABSTRACT

Systems, methods and articles of manufacture are disclosed for presenting a visual cue to a user in a virtual world. A cursor cycle allows the user to specify an avatar of focus by cycling through avatars in the virtual world. Visual cues of an avatar of focus are presented to the user. The user may define a cursor mask to include specific avatars. Visual cues of the cursor mask or of all avatars may be summarized and presented to the user. The user may also specify a threshold for a visual cue. A visual cue that is detected to exceed the specified threshold is presented to the user.

20 Claims, 7 Drawing Sheets

U.S. PATENT DOCUMENTS

| | | |
|---|---|---|
| 2010/0079467 A1* | 4/2010 | Boss et al. .................... 345/474 |
| 2010/0153497 A1* | 6/2010 | Sylvain et al. ................ 709/204 |
| 2010/0162149 A1* | 6/2010 | Sheleheda et al. ............ 715/764 |
| 2010/0211890 A1* | 8/2010 | Cragun et al. ................ 715/757 |
| 2010/0287510 A1* | 11/2010 | Cragun ........................ 715/848 |
| 2010/0313138 A1* | 12/2010 | Pare et al. ..................... 715/744 |

* cited by examiner

ASSISTIVE GROUP SETTING MANAGEMENT IN A VIRTUAL WORLD

BACKGROUND OF THE INVENTION

1. Field of the Invention

The field of the invention relates to virtual environments. More specifically, the field of the invention relates to conveying visual cues to users in a virtual world, particularly blind or otherwise sight impaired users.

2. Description of the Related Art

A virtual world is a simulated environment which users may inhabit and interact with virtual objects and locations of the virtual world. Users may also interact with one another via avatars. An avatar generally provides a graphical representation of an individual within the virtual world environment. Avatars are usually presented to other users as two or three-dimensional graphical representations that resemble a human individual. Frequently, virtual worlds allow multiple users to enter the virtual environment and interact with one another. Virtual worlds are said to provide an immersive environment, as they typically appear similar to the real world and objects tend to follow rules related to gravity, topography, locomotion, physics and kinematics. Of course, virtual worlds can suspend or alter these rules as well as provide other imaginative or fanciful environments. Users typically communicate with one another through their avatars using text messages sent between avatars, real-time voice communication, gestures displayed by avatars, symbols visible in the virtual world, and the like.

Some virtual worlds are described as being persistent. A persistent world provides an immersive environment (e.g., a fantasy setting used as a setting for a role-playing game, or a virtual world complete with land, buildings, towns, and economies) that is generally always available, and where events continue to occur, regardless of the presence of a given avatar. Thus, unlike more conventional online games or multi-user environments, the virtual world continues to exist, and plots and events continue to unfold as users enter (and exit) the virtual world. Virtual environments are presented to users as images on a display screen and through other output devices.

SUMMARY OF THE INVENTION

One embodiment of the invention includes a computer-implemented method for conveying a visual cue to a user in a group setting in a virtual world, the group setting comprising a plurality of avatars, the method comprising configuring one or more processors to perform an operation. The operation may generally include receiving, from the user, a selection of a specified avatar in the group setting in the virtual world; detecting a visual cue corresponding to an action that is performed by the specified avatar and is perceivable by sighted users; converting the visual cue into an alternative cue format perceivable by sight-impaired users; and outputting the alternative cue format to an output device.

Another embodiment of the invention includes a computer-implemented method for conveying a visual cue to a user in a virtual world, the method comprising configuring one or more processors to perform an operation. The operation may generally include defining a cursor cycle that specifies a plurality of avatars in the virtual world; providing a cursor that cycles through the plurality of avatars specified by the cursor cycle; receiving user input that positions the cursor on an avatar in the cursor cycle; and conveying an attribute of the avatar to the user.

Still another embodiment of the invention includes a computer-readable storage medium containing a program, which when executed by the processor is configured to perform an operation for conveying a visual cue to a user in a group setting in a virtual world, the group setting comprising a plurality of avatars. The operation should generally include receiving, from the user, a selection of a specified avatar in the group setting in the virtual world; detecting a visual cue corresponding to an action that is performed by the specified avatar and is perceivable by sighted users; converting the visual cue into an alternative cue format perceivable by sight-impaired users; and outputting the alternative cue format to an output device.

Yet another embodiment of the invention includes a system having a processor and a memory containing a program, which when executed by the processor is configured to perform an operation for conveying a visual cue to a user in a group setting in a virtual world, the group setting comprising a plurality of avatars. The operation should generally include receiving, from the user, a selection of a specified avatar in the group setting in the virtual world; detecting a visual cue corresponding to an action that is performed by the specified avatar and is perceivable by sighted users; converting the visual cue into an alternative cue format perceivable by sight-impaired users; and outputting the alternative cue format to an output device.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

A virtual world provides a simulated environment where users may be represented by avatars. An avatar may be used to "travel" through locations of the virtual world, such as virtual streets, buildings, rooms, etc. While in a given location, an avatar may also be used to interact with objects or other avatars present therein. For example, an avatar may be able to approach and interact with another avatar by communicating, performing commercial transactions, engaging in recreational activities, and the like. Thus, multiple users, although in different physical locations, may be present in the same virtual location and interact with one another using their respective avatars.

Embodiments of the present invention generally provide a method and apparatus for conveying a visual cue to a user in a group setting in a virtual world. Group settings frequently take place in virtual worlds. A group setting may include a meeting, a lecture, a planned gathering, an impromptu gathering, and the like. Workplace training or role modeling training may take place in virtual world environments. Management training is especially suited for this environment. While users in such settings often communicate verbally (e.g., through text or voice communications), a significant component to communication occurs through non-verbal means. Non-verbal feedback may include facial expressions/emotions/emoticons (such as laughing, smiling, frowning, or a confused expression), nodding, sleeping, distractedness, head shaking, hand raising, gesturing, crossing arms, fidgeting, shifting on a chair, finger tapping, toe tapping, and other body language (such as body gestures, postures, behaviors, etc.). A blind or otherwise sight impaired user in a group setting may not be able to observe non-verbal communications of an avatar in the group setting.

For example, suppose a sight impaired user is giving a speech at a virtual meeting. Suppose further that more than twenty percent of listeners (i.e., other avatars present at the virtual meeting) become inattentive. The sight impaired user may not be able to observe such visual cues (i.e., inattentiveness), even though such visual cues may indicate that the speech is too boring to the listeners or that the listeners have lost interest for other reasons (e.g., due to some other external conditions that may have distracted the listeners). If the visual cues (i.e., the inattentiveness) are conveyed to the sight impaired user, the sight impaired user may attempt to regain the interest of the listeners by, for example, changing the speech.

As a further example, suppose a sight impaired user is a listener at a virtual meeting. Suppose that the sight impaired user becomes confused about a statement made by a speaker at the virtual meeting. The sight impaired user may not be able to observe visual cues from other meeting participants (e.g., looks of confusion from other avatars). If the visual cues (i.e., looks of confusion) are conveyed to the sight impaired user, the sight impaired user may conclude that the statement itself is confusing or was misstated by the speaker, and may alert the speaker accordingly.

One embodiment of the invention provides a cursor cycle. The cursor cycle allows the user to specify an avatar of focus by cycling through avatars in the virtual world. Visual cues of an avatar of focus may be conveyed to the user via an output device such as an audio device, Braille device, graphical display (e.g., via text), and the like. The output device may also include, or be used in conjunction with, text-to-speech functionality such as a screen reader application.

In a group setting, certain avatars may better represent a mood of the group. Further, certain avatars may play a key role in the group (e.g., may be a manager, discussion leader, or group leader). Certain avatars may also present a concern or threat to the user (e.g., an avatar of a user who works for a competitor).

Accordingly, one embodiment of the invention allows a user to define a cursor mask to include specific avatars. Once defined, the cursor mask allows the user to change an avatar of focus by cycling through specific avatars of the cursor mask.

Feedback in a form of visual cues of the group may not always be readily accessible even to a sighted user in a group setting. For example, in a virtual meeting with twenty avatars, it may not always be apparent how many (or more importantly, what percentage of) avatars are attentive, distracted, confused, frowning, etc.

Accordingly, one embodiment of the invention provides a summary of visual cues in a group setting. For example, the number of attentive avatars and the number of distracted avatars are summarized and presented to the user. Such information may be useful to any user in the group setting, whether the user is a sight impaired user or a sighted user. In one embodiment, visual cues of cursor-masked avatars or of all avatars may be summarized and presented to the user.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
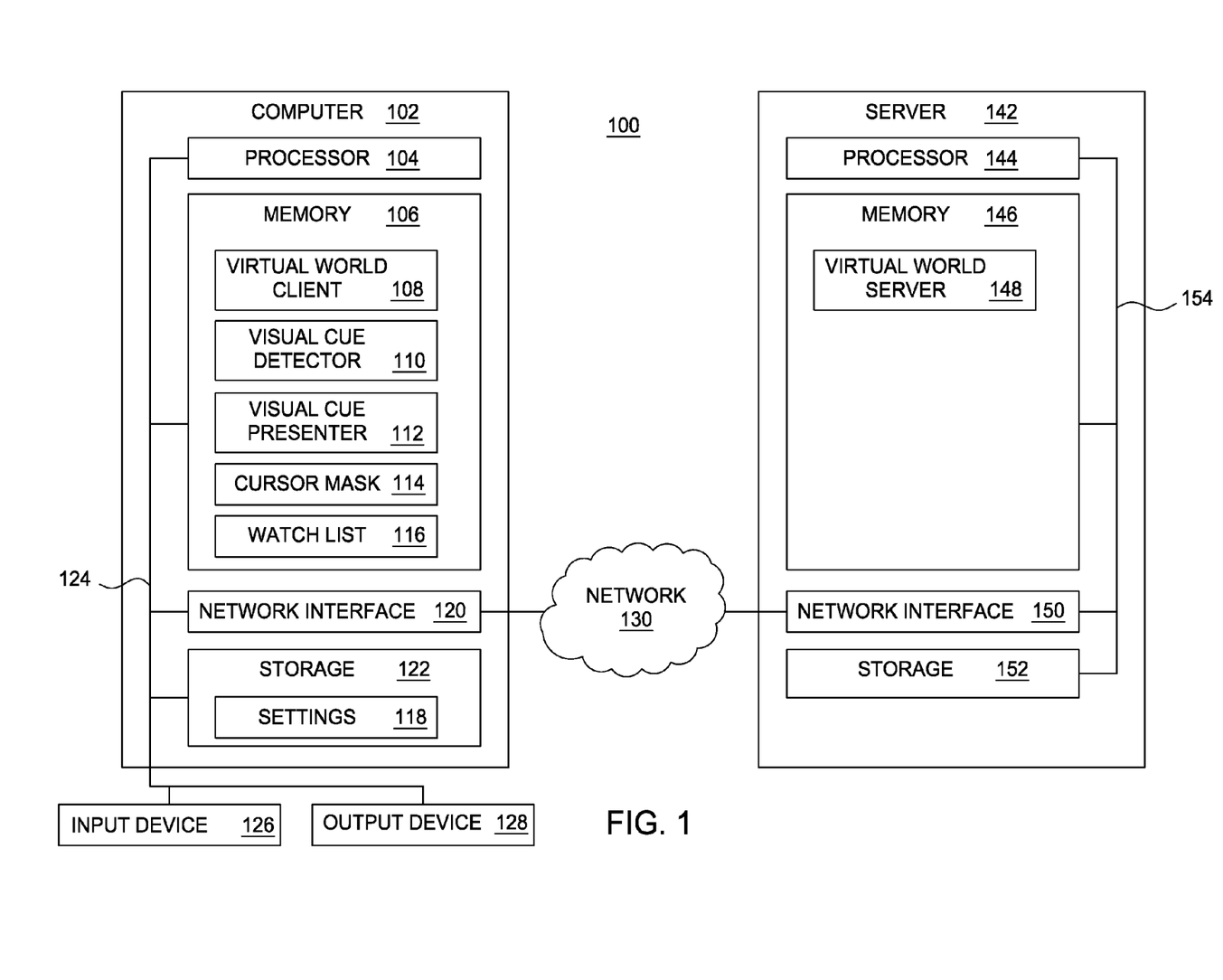
FIG. 1 is a block diagram illustrating a system for conveying visual cues, according to one embodiment of the invention.

FIG. 1 is a block diagram illustrating a system 100 for conveying visual cues, according to one embodiment of the invention. In general, the networked system 100 includes a computer 102 and a server 142. The computer 102 and the server 142 are connected via a network 130. In general, the network 130 may be a telecommunications network and/or a wide area network (WAN). In a particular embodiment, the network 130 is the Internet.

The computer 102 includes a processor 104 connected via a bus 124 to a memory 106, a network interface device 120, a storage 122, an input device 126, and an output device 128. The processor 104 could be any hardware processor used to perform an embodiment of the invention.

The computer 102 is generally under the control of an operating system (not shown). Examples of operating systems include UNIX, versions of the Microsoft Windows® operating system, and distributions of the Linux® operating system. (Note: Linux is at trademark of Linus Torvalds in the United States and other countries.) More generally, any operating system supporting the functions disclosed herein may be used.

The memory 106 is preferably a random access memory sufficiently large to hold the necessary programming and data structures of the invention. While the memory 106 is shown as a single entity, it should be understood that the memory 106 may in fact comprise a plurality of modules, and that the memory 106 may exist at multiple levels, from high speed registers and caches to lower speed but larger DRAM chips.

As shown, the memory 106 includes a virtual world client 108, a visual cue detector 110, a visual cue presenter 112, a cursor mask 114, and a watch list 116, according to one embodiment of the invention.

In one embodiment, the virtual world client 108 provides a software program that allows a user to connect to a virtual world server application 148 on the server 142, and once connected, to perform various user actions. Such actions may include exploring virtual locations, interacting with other avatars, interacting with virtual objects, and participating in group settings in a virtual world. Further, the virtual world client 108 may be configured to generate and display a visual representation of the user within the immersive environment, generally referred to as an avatar. The avatar of the user is generally visible to other users in the virtual world, and the user may view avatars representing the other users. The virtual world client 108 may also be configured to generate and display the immersive environment to the user and to transmit the user's desired actions to the virtual world server 148. Such a display may include content from the virtual world determined from the user's line of sight at any given time. For the user, the display may present a third-person perspective, meaning a view from a location other than that of the user's avatar, and which may include the image of the user's avatar within the virtual world. Alternatively, the display may present a first-person perspective, meaning a view of the virtual world as would be seen through the eyes of the avatar representing the user.

According to one embodiment, the visual cue detector 110 detects visual cues from avatars in the vicinity of the user. Visual cues may include facial expressions/emotions/emoticons (such as laughing, smiling, frowning, or a confused expression), nodding, sleeping, distractedness, head shaking, hand raising, gesturing, crossing arms, fidgeting, shifting on a chair, finger tapping, toe tapping, and other body language (such as body gestures, postures, behaviors, etc.). In one embodiment, the "vicinity" of the user may be defined as some specified distance from the user's avatar. For example, visual cues may be detected from all avatars located within a predefined radius (e.g., 15 feet, or some other radius which may be user selected) of the user in a virtual world.

The "vicinity" of the user may also be context sensitive. For example, suppose the user is engaged in a group meeting. Suppose further that participants in the group meeting are listed in a roster for the group meeting. In one embodiment, the "vicinity" of the user may include only avatars within a fifteen-foot radius and on the roster. Once a visual cue is detected, the visual cue presenter 112 adapts the detected visual cue for output via the output device 128. FIGS. 2 through 7 and associated descriptions detail the structure and operation of the visual cue presenter 112.

In one embodiment, the visual cue detector 110 may receive input from the virtual world client 108 or from a virtual world server 148 indicating that an avatar has exhibited a visual cue. The visual cue detector 110 may also receive input from a behavior recognition application that detects behaviors of avatars (for example, via facial recognition techniques). As a further example, the visual cue detector 110 may detect inactivity on input devices (such as a keyboard or mouse) and instruct the visual cue presenter 112 to present the inactivity as a visual cue. Those skilled in the art will recognize that embodiments of the invention may be adapted for use with other similar ways of detecting visual cues. The visual cue detector 110 is described in further detail below, in conjunction with FIG. 2.

Although embodiments are described herein with reference to visual cues from avatars in the vicinity of the user, those skilled in the art will recognize that embodiments of the invention may be adapted for use with visual cues from avatars in any arbitrarily defined area of a virtual world. For example, the area may be defined by a radius from the user's avatar or of some other user's avatar, a specific fixed location (e.g., within a building or room), etc.

In one embodiment, the visual cue presenter 112 provides a cursor cycle that allows a user to cycle focus between avatars in a given vicinity via a keystroke (such as TAB). The cursor cycle may also allow a user to back-cycle focus via a different key stroke (such as SHIFT+TAB). Once focus reaches a last avatar of the cursor cycle, the cursor cycle may loop back to the first avatar of the cursor cycle. Each cursor cycle event (e.g. keystroke) may be confirmed by some feedback, e.g. audible or tactile. Further, the feedback may be unique for each different avatar, thereby allowing the user to identify the selected avatar of focus. For example, the name of the selected avatar may be audibly output to the user via speakers. The visual cue presenter 112 may indicate to the user that the cursor cycle has ended (by playing a sound, for example), according to one embodiment.

The user may inspect an avatar by placing focus on the avatar via the cursor cycle, according to one embodiment. When focus is on an avatar, the visual cue presenter 112 may convey visual cues of the avatar (such as "sitting", "distracted", etc.) to the user. For example, the visual cues may be vocalized via an audio device (e.g., in conjunction with a screen reader, etc.), output via a Braille device, or output as text on a graphical display.

One embodiment of the invention allows a user to define a cursor mask 114. A cursor mask may be a list of "key" avatars. In one embodiment, a user may define a cursor mask 114 by cycling through avatars in a cursor cycle and adding key avatars to the cursor mask 114. Once defined, the cursor mask 114 may restrict the cursor cycle to only the selected key avatars. The cursor mask 114 is described in further detail below, in conjunction with FIG. 2.

Further, one embodiment of the invention allows a user to define a watch list 116. A watch list 116 specifies a list of visual cues to "watch" for. In one embodiment, when an avatar is inspected via the cursor cycle, the visual cue presenter 112 may only convey a visual cue from the avatar if the watch list 116 includes the visual cue. In another embodiment, the watch list 116 may specify a visual cue that is avatar-specific. The watch list 116 is described in further detail below, in conjunction with FIG. 2.

In one embodiment, the visual cue presenter 112 may convey visual cues from key avatars in the cursor mask 114. Conversely, the visual cue presenter 112 may prevent visual cues from avatars not in the cursor mask 114 from being conveyed. In this way, the cursor mask 114 allows a user to focus the cursor cycle between key avatars.

Although embodiments are described herein with reference to a visual cue presenter 112 that resides in the memory 106 of the computer 102, those skilled in the art will recognize that embodiments of the invention may be adapted for use with a visual cue presenter 112 that wholly or partially resides elsewhere, such as on a server 142, or both on a computer 102 and on a server 142. Further, in some embodiments, the visual cue presenter 112 may be integrated into the virtual world client 108, into a virtual world server 148, or into both. Similarly, the visual cue detector 110, the cursor mask 114, the watch list 116, and the settings 118 may reside on the server 142 or both on a computer 102 and on a server 142. Further, the visual cue detector 110 may also be integrated into the visual cue presenter 112, according to one embodiment.

The network interface device 120 may be any entry/exit device configured to allow network communications between the computer 102 and the server 142 via the network 130. For example, the network interface device 120 may be a network adapter or other network interface card (NIC).

The storage 122 may be a Direct Access Storage Device (DASD). Although the storage 122 is shown as a single unit, the storage 122 may be a combination of fixed and/or removable storage devices, such as fixed disc drives, floppy disc drives, tape drives, removable memory cards, or optical storage. The memory 106 and the storage 122 may be part of one virtual address space spanning multiple primary and secondary storage devices.

As shown, the storage 122 includes settings 118. In one embodiment, the visual cue presenter 112 may allow a user to configure the settings 118. The settings 118 specify a particular manner in which a visual cue is output via an output device 128. The settings 118 are described in further detail below, in conjunction with FIG. 2.

Although embodiments are described herein with reference to a cursor mask 114, a watch list 116, and settings 118 that are stored on the computer 102, those skilled in the art will recognize that embodiments of the invention may be adapted for a cursor mask 114, a watch list 116, and settings 118 that are stored elsewhere. For example, the settings 118 may be stored in the storage 152 of the server 142. That is, in some embodiments, the visual cue presenter 112 may retrieve the settings 118 from the server 142 via the network 130. The cursor mask 114 and watch list 116 may similarly reside on the server 142. Furthermore, network models other than client-server, such as peer-to-peer, are broadly contemplated, and may be supported be embodiments of the invention.

The input device 126 may be any device for providing input to the computer 102. For example, a keyboard, mouse, keypad, light pen, touch-screen, track-ball, speech recognition unit, and the like may be used.

The output device 128 may be any device for providing output to a user of the computer 102. For example, the output device 128 may be any conventional display screen or set of speakers, along with their respective interface cards, i.e., video cards and sound cards (not shown). Further, the output device 128 may be a tactile-detectable device, such as a Braille device. In one embodiment, the output device 128 may also include, or be used in conjunction with, text-to-speech functionality such as a screen reader application. Although shown separately from the input device 126, the output device 128 and input device 126 may be combined. For example, a display screen with an integrated touch-screen, a display with an integrated keyboard, or a speech recognition unit combined with a text speech converter may be used.

The server 142 generally includes a processor 144, a memory 146, a network interface device 150, and a storage device 140, coupled to one another by a bus 154. The memory 146 may be a random access memory sufficiently large to hold the necessary programming and data structures that are located on the communications server 142. The programming and data structures may be accessed and executed by the processor 144 as needed during operation.

The storage 152 may be a Direct Access Storage Device (DASD). Although the storage 152 is shown as a single unit, the storage 152 may be a combination of fixed and/or removable storage devices, such as fixed disc drives, floppy disc drives, tape drives, removable memory cards, or optical storage. The storage 152 may also include network-attached storage. The memory 146 and the storage 152 may be part of one virtual address space spanning multiple primary and secondary storage devices.

Figure 2:
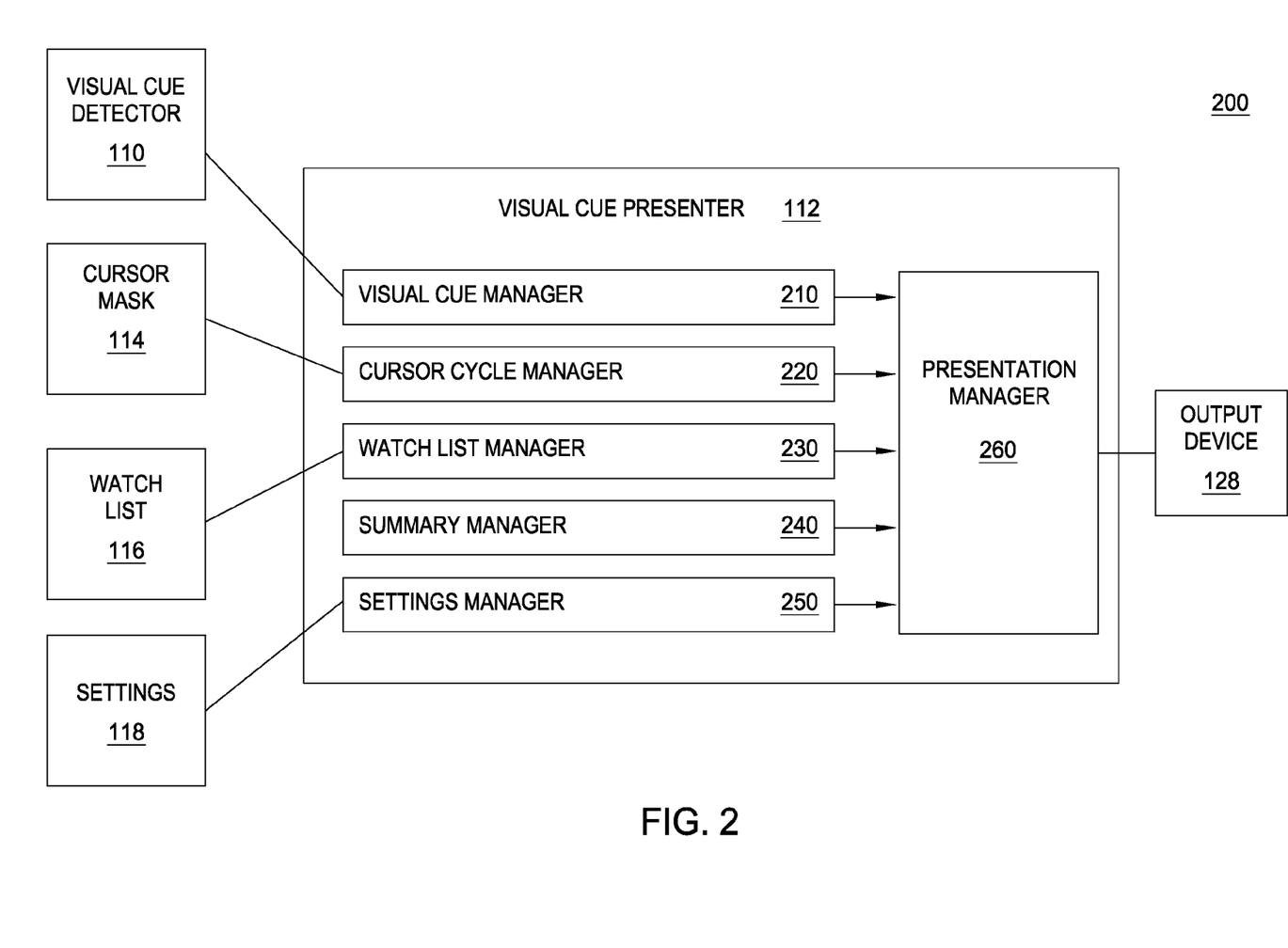
FIG. 2 is a block diagram illustrating a functional view of a visual cue presenter, according to one embodiment of the invention.

FIG. 2 is a block diagram illustrating a functional view 200 of the visual cue presenter 112 of FIG. 1, according to one embodiment of the invention. As shown, the visual cue presenter 112 includes a visual cue manager 210, a cursor cycle manager 220, a watch list manager 230, a summary manager 240, a settings manager 250, and a presentation manager 260.

In one embodiment, the presentation manager 260 receives commands from the visual cue manager 210, the cursor cycle manager 220, the watch list manager 230, the summary manager 240, and the settings manager 250. The commands describe a manner of presenting a visual cue to a user via one or more output devices (e.g., the output device 128 shown in FIG. 1). After processing the commands, the presentation manager 260 adapts a visual cue for output via the output device 128.

The visual cue manager 210 receives input from the visual cue detector 110 and sends commands to the presentation manager 260, according to one embodiment. For example, if the visual cue detector 110 detects that an avatar is nodding, the visual cue detector 110 may notify the visual cue manager 210. The visual cue manager 210 may then send a command to the presentation manager 260 for conveying the visual cue (i.e., the nodding) to a user. The presentation manager 260 may convey the visual cue to the user via an output device, such as an audio device or a Braille device. The visual cue may also be presented as text on a graphical display. The particular mode and device of output may be selected by the user.

The cursor cycle manager 220 receives an avatar of focus and sends commands to the presentation manager 260, according to one embodiment. The cursor cycle manager 220 may supports a cursor cycle function. The cursor cycle allows a user to cycle focus between nearby avatars via a keystroke (such as TAB). In one embodiment, when a user inspects an avatar (e.g., by placing focus on the avatar via the cursor cycle), the presentation manager 260 may convey visual cues exhibited by the avatar (such as "sitting", "distracted", etc.) to the user. In addition, the presentation manager 260 may convey other information associated with an inspected avatar, such as name of the avatar. An illustrative inspection for an avatar named Samuel is shown in Table I:

TABLE I

| Inspection example | |
|---|---|
| Name of avatar: | Samuel |
| Visual cues: | Sitting, Distracted, Negative Mood, Talking (Whispering) to another avatar person |

In the above example, inspection information includes that the Samuel avatar is exhibiting the visual cues of "sitting", "distracted", "a negative mood", and talking to another avatar person. The presentation manager 260 may convey the visual cues to a user via an output device.

In one embodiment, the cursor cycle manager 220 may also receive user input defining a cursor mask 114. For example, a user may cycle focus between avatars via a keystroke (such as TAB) and add key avatars to a cursor mask 114 via a different keystroke (such as SPACEBAR). In one embodiment, a user may also remove an avatar from a cursor mask 114 via a keystroke (such as SPACEBAR, for an avatar already in a cursor mask 114). Once the cursor mask 114 is defined, the cursor cycle manager 220 may allow a user to cycle focus between key avatars of the cursor mask 114 via a different keystroke (such as CTRL+TAB). For example, suppose that an avatar Reginald belongs to a user. Suppose further that Reginald is participating in a group setting in a virtual world with avatars Darlene, Samuel, Phyllis, Starlight, and Foxy. An illustrative cursor mask is shown in Table II:

TABLE II

| Cursor mask example Name of key avatar |
|---|
| Samuel |
| Starlight |
| Foxy |

In the above example, the cursor cycle manager 220 receives user input that defines a cursor mask 114 to include avatars Samuel, Starlight, and Foxy (and excludes Darlene, Phyllis, and Reginald). That is, a user may define a cursor mask to include a limited number of avatars. For example, the limited number of avatars may include only avatars with influence in decision making, avatars with less knowledge on a subject, avatars likely to disagree with the content, etc. For example, the avatar Darlene is found in the cursor cycle but is not included in the cursor mask 114. Accordingly, a user who cycles through key avatars will inspect Samuel, Starlight, and Foxy, but not Darlene. It is contemplated that cursor masks may be persistently stored and that a user may define a plurality of cursor masks. The user may then selectively enable or disable the masks depending on the particular context and group members present in a given group setting.

The watch list manager 230 receives user input defining a watch list 116 and sends commands to the presentation manager 260, according to one embodiment. The watch list defines visual cues to watch for (i.e., "watches"). An illustrative watch list 116 is shown in Table III:

TABLE III

| Watch list example | | | |
|---|---|---|---|
| Target | Watch | Threshold | Difference |
| All nearby avatars | Anger | >20% | n/a |
| All nearby avatars | Nodding | <60% | n/a |
| Cursor mask | Distractedness | >50% | No |
| Starlight | Smiling | None | Yes |
| Foxy | Any | None | No |

According to one embodiment, a watch may include a target. As shown in the above example, a target may specify that a watch is for all nearby avatars (the first two watches of Table III), is specific to a cursor mask (the third watch of Table III), or is specific to a particular avatar (the fourth watch of Table III). Further, the user input may define a threshold for a watch. For example, distractedness among avatars in the cursor mask may only be presented when the distractedness exceeds a specific threshold (e.g., 50% of the avatars in the cursor mask). The threshold may be expressed as a percentage or as a number of occurrences of a visual cue. In contrast, because no threshold was defined for the "Smiling" watch, smiling behavior of the Starlight avatar may always be presented. In one embodiment, both an upper threshold and a lower threshold may be defined for a watch.

In one embodiment, a "difference" flag of a watch specifies whether a visual cue must be different from avatars outside of the watch in order to be presented. For example, if a difference flag is on, then smiling behavior of the Starlight avatar may only be presented when no other avatar is smiling. In contrast, any visual cue of the Foxy avatar (whose difference flag is off) may be presented, regardless of the visual cues of other avatars.

In one embodiment, the cursor cycle manager 220 may provide a "watched cursor cycle." A watched cursor cycle allows a user to cycle focus only among avatars exhibiting a visual cue in the watch list 116. For example, suppose the watch list 116 includes a watch for a "confused" expression. If five avatars express confusion, the watched cursor cycle allows a user to cycle between the five avatars. For example, the user may gather confused listeners and re-explain an idea.

The summary manager 240 receives input from the visual cue manager 210 to compute a summary of visual cues, according to one embodiment. The summary manager 240 may instruct the presentation manager 260 to present the summary of visual cues via the output device 128. An illustrative summary is shown in Table IV:

TABLE IV

| Summary example | |
|---|---|
| Visual Cue | Total |
| Standing | 0/6 |
| Sitting | 6/6 |
| Mood: positive | 5/6 |
| Mood: negative | 1/6 |
| Attentive | 5/6 |
| Distracted | 1/6 |

In the above example, the summary manager 240 receives input from the visual cue manager 210 and computes a summary of visual cues. For a group setting of six avatars, the summary provides that zero avatars are standing while six avatars are sitting; five avatars exhibit a positive mood while one avatar exhibits a negative mood; and five avatars appear attentive while one avatar appears distracted. In one embodiment, the summary may be vocalized to a user via an audio device or output via a Braille device. The summary may also be presented on a graphical display. Further, a user may customize the summary by including or excluding visual cues, according to one embodiment.

In one embodiment, the summary manager 240 may summarize other information associated with avatars. For example, in a virtual meeting in which a user is speaking, three avatars may express confusion, but the three avatars may also be late arrivals to the virtual meeting. Such information may suggest that the user should re-explain an early concept (i.e., that latecomers may have missed). In a further example, the three avatars may also be new users to the virtual world. Such information may suggest that the user should tailor an explanation for new users of the virtual world (e.g., explain acronyms, etc.). Further, a user may customize the summary by including or excluding information associated with avatars, according to one embodiment.

In one embodiment, the summary may exclude visual cues of an avatar that belongs to the user. In another embodiment, the summary may include only visual cues from avatars in a cursor mask 114 (as opposed to all nearby avatars).

The settings manager 250 receives user input to configure settings 118, according to one embodiment. The settings manager 250 instructs the presentation manager 260 to convey visual cues based on the settings 118. Illustrative settings are shown in Table V:

TABLE V

Settings example

| Visual cue | Output type | Output setting |
|---|---|---|
| Sitting | Braille | Text (Braille) |
| Nodding | Audio | Text (Vocalized) |
| Distracted | Audio | Frog croak |
| Fidgeting | Audio | Bird chirp |
| Hand raising | Audio | Bell ring |
| Head shaking | Audio | Percussion sound |

In the above example, the settings manager 250 receives user input and configures settings 118. Each entry in the settings 118 includes a visual cue, an output type (such as "audio"), and an output setting (such as "frog croak"). As shown, the settings 118 specify that a visual cue of "sitting" should be presented via a Braille device. The settings 118 further specify that the following visual cues should be output via an audio device: "nodding", presented as vocalized text (i.e., text that is read aloud to a user via an audio device); "distracted", presented as a frog croak; "fidgeting", presented as a bird chirp; "hand raising", presented as a bell ring, and "head shaking", presented as a percussion sound. Other visual cues, output types, and output settings are broadly contemplated, and may be supported by embodiments of the invention.

In one embodiment, more than one visual cue may be presented simultaneously to a user. For example, a simultaneous bell ring and percussion sound may indicate that a hand is raised and a head is shaking. Further, sounds of various tones, patterns, or frequencies may be presented simultaneously. For example, standing and sitting may be presented as a high and low brass sound, respectively; motion may be presented as a string sound; and side conversations may be presented as a percussion sound.

In one embodiment, one user may specify sounds that blend with an outdoor environment (such as a bird chirp, a cricket chirp, rustling of leaves, wind sounds, etc.) to represent visual cues of other avatars. In one embodiment, even when the sounds are presented to all avatars in a group setting, the sounds only carry meaning (i.e., underlying visual cue information) to the one user. In another embodiment, the sounds are only audible to the one user and not to other users in the group setting. For example, the sounds may be output to the one user via a private audio channel.

The visual cue presenter 112 may convey only visual cues that have changed since a last inspection of the avatar of focus, according to one embodiment. For example, the visual cue presenter 112 may not report that an avatar is angry if the visual cue presenter 112 has previously reported the avatar to be angry (i.e., during a previous inspection of the avatar).

In one embodiment, the visual cue presenter 112 may also convey other information associated with an avatar of focus. Such information may include a real name of a user of the avatar, an age of the avatar, an age of the user, a location of the user, an amount of time the user has spent in the virtual world (e.g., 50 hours), an amount of time since the user first participated in the virtual world (e.g., 3 months), and any other information that may be associated with an avatar or with a user of an avatar.

Figure 3:
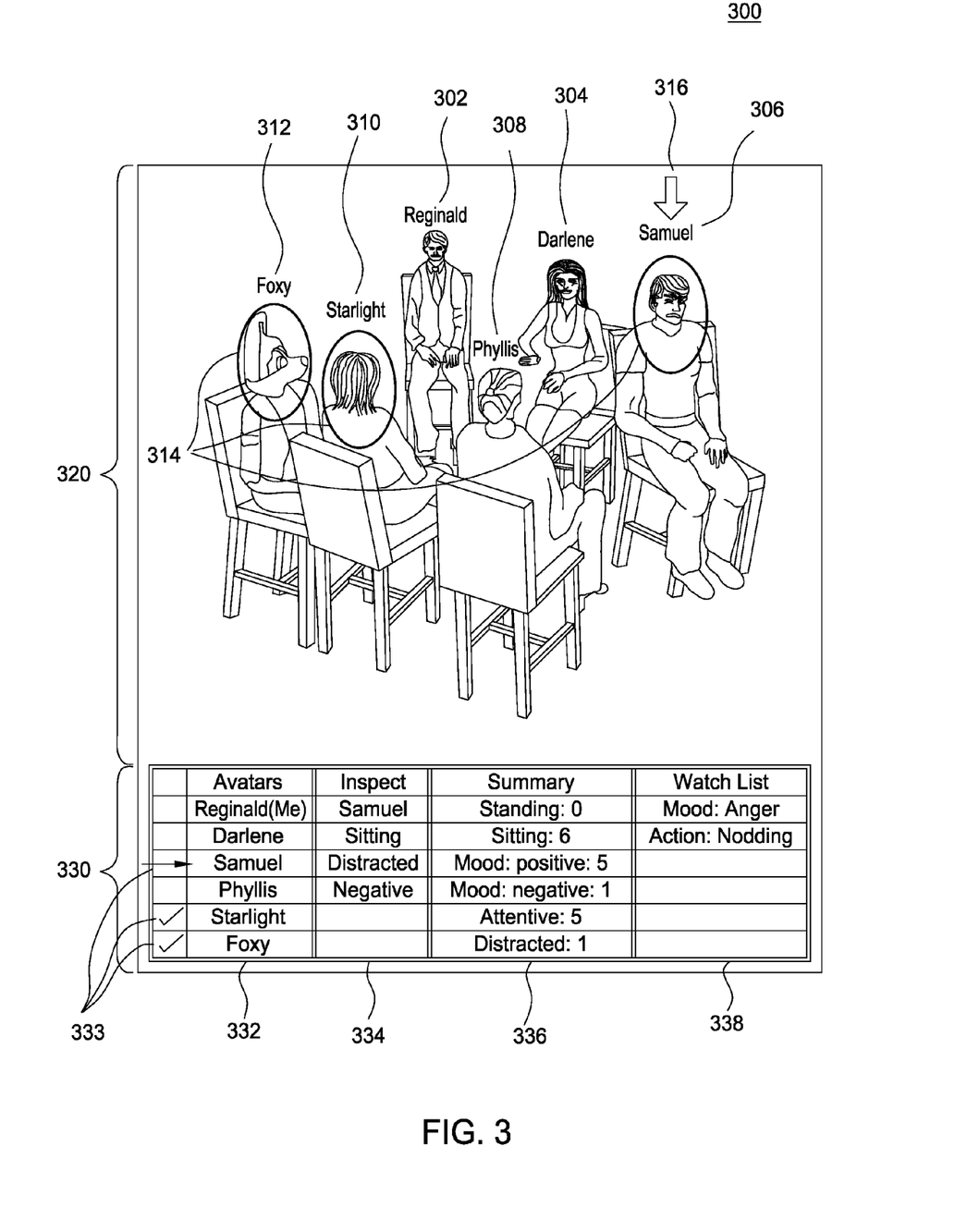
FIG. 3 illustrates a graphical user interface that includes a group setting in a virtual world, according to one embodiment of the invention.

FIG. 3 illustrates a graphical user interface 300 that includes group setting 320 in a virtual world and a textual presentation 330 of visual cues, according to one embodiment. Those skilled in the art will recognize that the graphical user interface 300 is exemplary and is not intended to be limiting of the invention. The textual presentation 330 corresponds to an output generated by the visual cue presenter 112 of FIG. 1 for an output device 128 of a graphical display. Further, FIG. 3 is described in conjunction with avatars of Table II.

As shown, the graphical user interface 300 includes a group setting 320 in a virtual world. The group setting 320 includes the following avatars: Reginald 302, Darlene 304, Samuel 306, Phyllis 308, Starlight 310, and Foxy 312. Further, the graphical user interface 300 includes a textual presentation 330 of visual cues. The textual presentation 330 includes an avatar pane 332, an inspection pane 334, a summary pane 336, and a watch pane 338. The graphical user interface 300 shown is as seen by a user of Reginald 302.

As shown, the group setting 320 includes Reginald 302, Darlene 304, Samuel 306, Phyllis 308, Starlight 310, and Foxy 312 engaged in a sit-down discussion. Circles 314 on Samuel 306, Starlight 310, and Foxy 312 indicate that a cursor mask 114 includes Samuel 306, Starlight 310, and Foxy 312. Further, an arrow 316 indicates that Samuel 306 is the avatar of focus. Indicators other than circles and arrows are broadly contemplated and may be supported by embodiments of the invention.

As shown, unlike other avatars in the discussion, Samuel 306 is faced away from the other avatars and is frowning. The orientation and facial expression of Samuel 306 represent visual cues that may indicate distractedness and a negative mood. The visual cue presenter 112 provides a sight impaired user access to such visual cues. In particular, the visual cue presenter 112 may output visual cue information (such as information included in the textual presentation 330) via an audio device, a Braille device, a graphical display (shown in large font, for example) or a combination thereof.

The avatar pane 332 includes a list of all avatars in the vicinity of the user (in this case, the vicinity of Reginald 302). Further, the avatar pane 332 includes a symbol 333 indicating that a cursor mask 114 includes Samuel 306, Starlight 310, and Foxy 312. The symbol may be any indicator, such as a checkmark or an arrow. Further, the avatar pane 332 includes a symbol (i.e., the arrow) that Samuel 306 is the avatar of focus.

The inspection pane 334 presents visual cues for Samuel 306. The visual cues correspond to the visual cues exhibited by Samuel 306 in the group setting 320. Further, the visual cues correspond to the inspection example in Table I. As shown, the inspection pane 334 describes Samuel 306 as sitting, distracted, and in a negative mood.

The summary pane 336 presents a summary of visual cues for all avatars of the group setting 320. The summary corresponds to the summary example in Table IV. As shown, the summary pane 336 provides that zero avatars are standing while six avatars are sitting; five avatars exhibit a positive mood while one avatar exhibits a negative mood; and five avatars appear attentive while one avatar appears distracted. In one embodiment, the summary presents visual cues for all avatars in the vicinity of a user. In another embodiment, the summary presents visual cues only for avatars of a cursor mask 114. Further, the summary may include a value representing the total number of avatars in the vicinity of the user, such as shown in Table IV.

The watch pane 338 presents a watch list 116 (i.e., a list of visual cues to watch for). The watch list 116 corresponds to the first two entries in the watch list of Table III. As shown, user input has specified "Mood: Anger" and "Action: Nodding" as visual cues to watch for. In one embodiment, the visual cue presenter 112 may only convey a visual cue of an avatar when focus is on the avatar and the visual cue is on the watch list 116. Alternatively, the visual cue presenter 112 may convey a visual cue on a watch list 116 regardless of the focus. Further, the visual cue presenter 112 may also automatically focus on the avatar that exhibits a visual cue on the watch list 116. In yet another embodiment, the visual cue presenter 112 may convey a visual cue of an avatar when focus is on the avatar, regardless of whether the visual cue is on the watch list 116. In such a case, the watch list 116 merely specifies which visual cues should be presented from an avatar that is not in focus.

Figure 4:
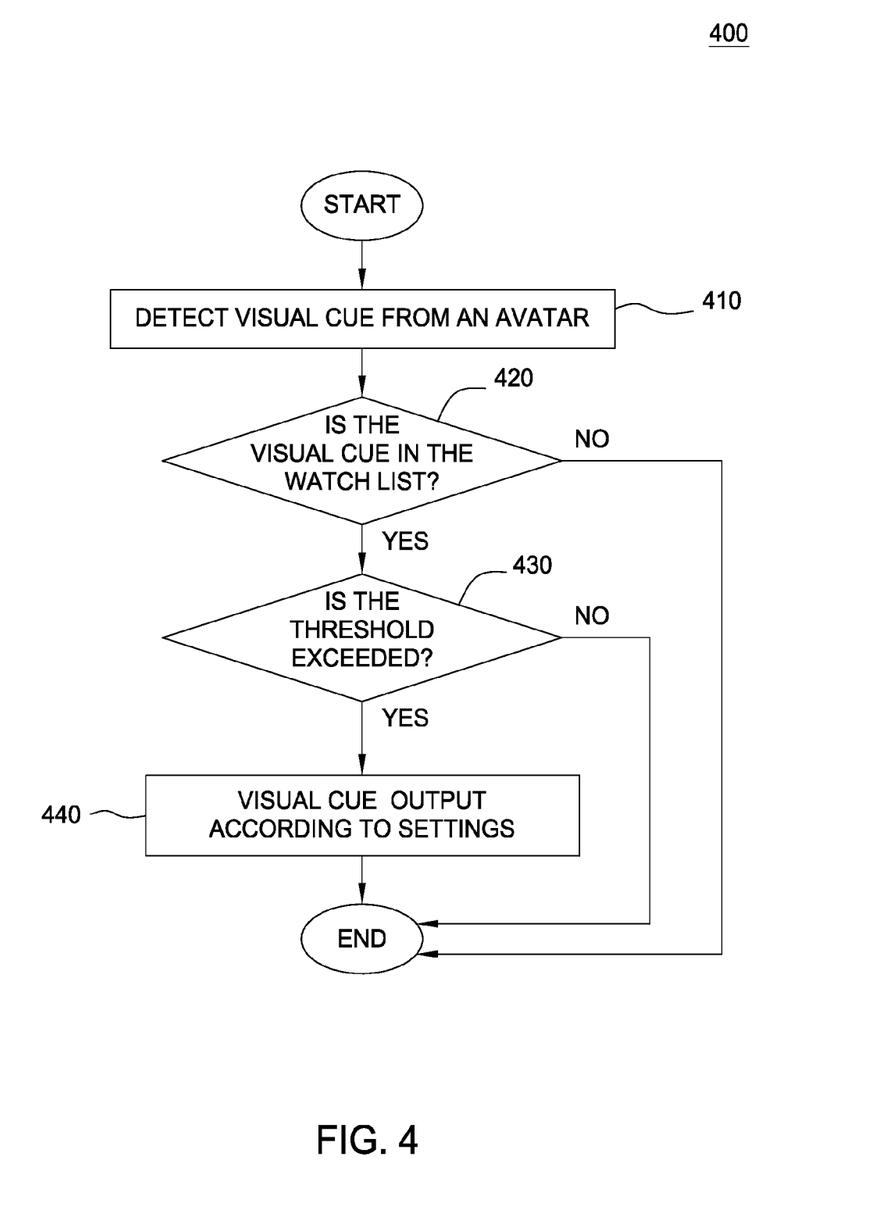
FIG. 4 is a flowchart depicting a method for conveying a visual cue, according to one embodiment of the invention.

FIG. 4 is a flowchart depicting a method 400 for presenting a visual cue, according to one embodiment of the invention. The steps of method 400 are described in conjunction with the watch list of Table III, the inspection information of Table I, and the settings of Table V.

As shown, the method 400 begins at step 410, where the visual cue detector 110 may detect a visual cue from an avatar in a group setting 320. For example, Samuel 306 may appear distracted in the group setting 320. The visual cue manager 210 may receive the detected visual cue from the visual cue detector 110.

At step 420, the watch list manager 230 may check whether the watch list 116 includes a watch for the detected visual cue. If so, the method 400 proceeds to step 430, where the watch list manager 230 may determine if an associated threshold is exceeded; otherwise, the method 400 terminates. For example, the watch list of Table III may be checked to determine if "Samuel is distracted" is included as a watch. Table III includes a watch for distractedness in a cursor mask 114 (i.e., Samuel 306, Starlight 310, and Foxy 312), which includes Samuel 306. However, an associated threshold of ">50%" is not exceeded because other avatars in the group setting 320 are attentive.

If the associated threshold is exceeded, the method 400 proceeds to step 440, where the presentation manager 260 may present the visual cue for output via the output device 128, according to settings 118; otherwise, the method 400 terminates. For example, if the threshold of ">50%" had in fact been exceeded, a frog croak may be played on an audio device of a user (according to Table V). The frog croak represents that the watched visual cue of "distractedness" is occurring beyond a specified threshold. Step 430 may be aided by maintenance of counters, according to one embodiment. Each counter may be specific to a visual cue of an avatar. The counters may be maintained by the visual cue manager 210 and stored in the watch list 116, according to one embodiment. After step 440, the method 400 terminates.

Figure 5:
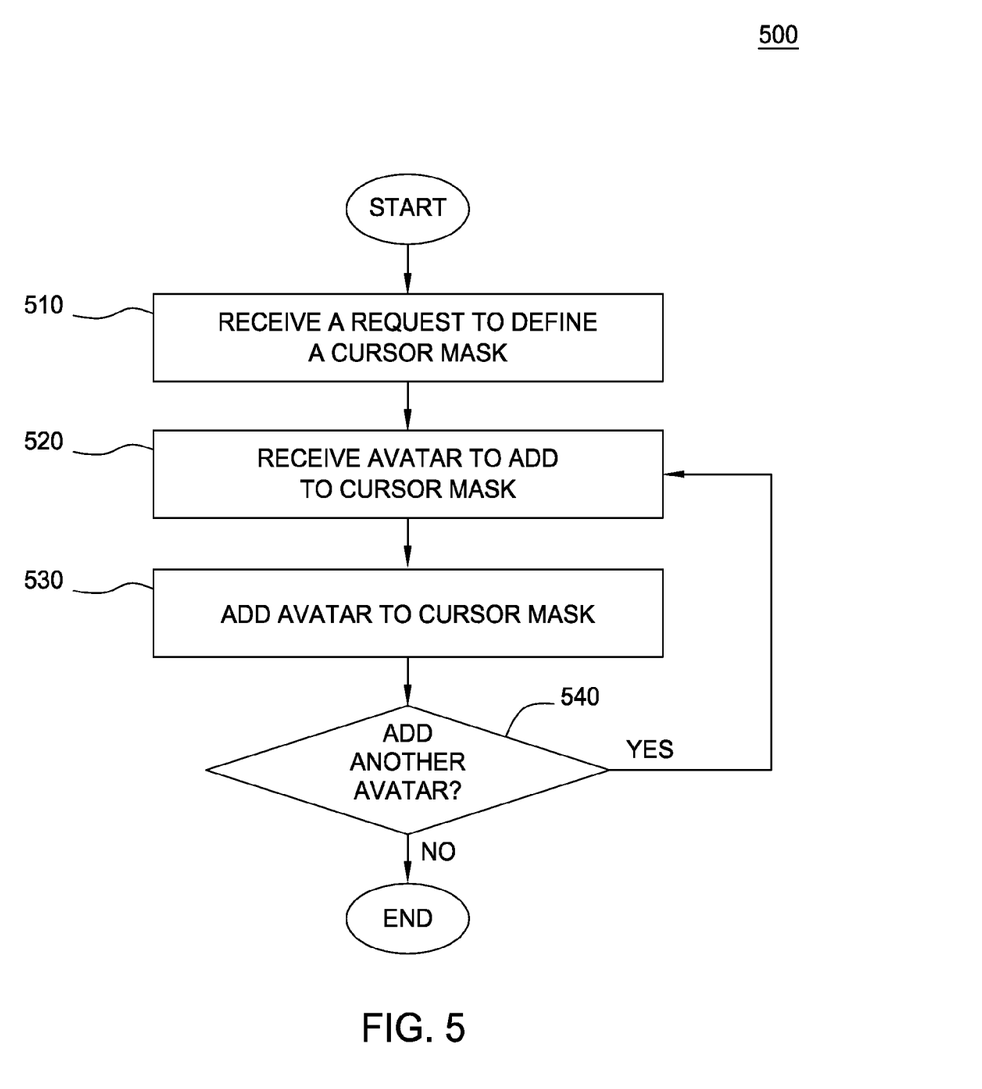
FIG. 5 is a flowchart depicting a method for defining a cursor mask, according to one embodiment of the invention.

FIG. 5 is a flowchart depicting a method 500 for defining a cursor mask, according to one embodiment of the invention. The steps of method 500 are described in conjunction with the cursor mask of Table II. Further, the cursor mask of Table II corresponds to the circles 314 and the symbols 333 of FIG. 3.

As shown, the method 500 begins at step 510, where the cursor cycle manager 220 receives a request to define a cursor mask 114. For example, a user may input a specific keystroke (such as CTRL+M) for defining a cursor mask 114. At step 520, the cursor cycle manager 220 receives an avatar to add to the cursor mask 114. For example, the user may press TAB to cycle between all avatars, and press SPACE to add an avatar to the cursor mask. At step 530, the cursor cycle manager 220 adds the avatar to the cursor mask 114. For example, a name of the avatar (such as Darlene) may be added to the cursor mask in Table II.

At step 540, the cursor cycle manager 220 determines whether the user wishes to add another avatar to the cursor mask 114. If so, the method 500 proceeds to step 520; otherwise, the method 500 terminates. For example, a user may press TAB and SPACE to add other avatars to the cursor mask 114, and signal that the cursor mask 114 is finished by typing CTRL+M.

Advantageously, once a cursor mask 114 is defined, a user may cycle through avatars in the cursor mask 114 (instead of cycling through all avatars in a group setting 320). In one embodiment, a user may also bypass the cursor mask and cycle through all avatars in a group setting 320, even after a cursor mask 114 is defined.

Figure 6:
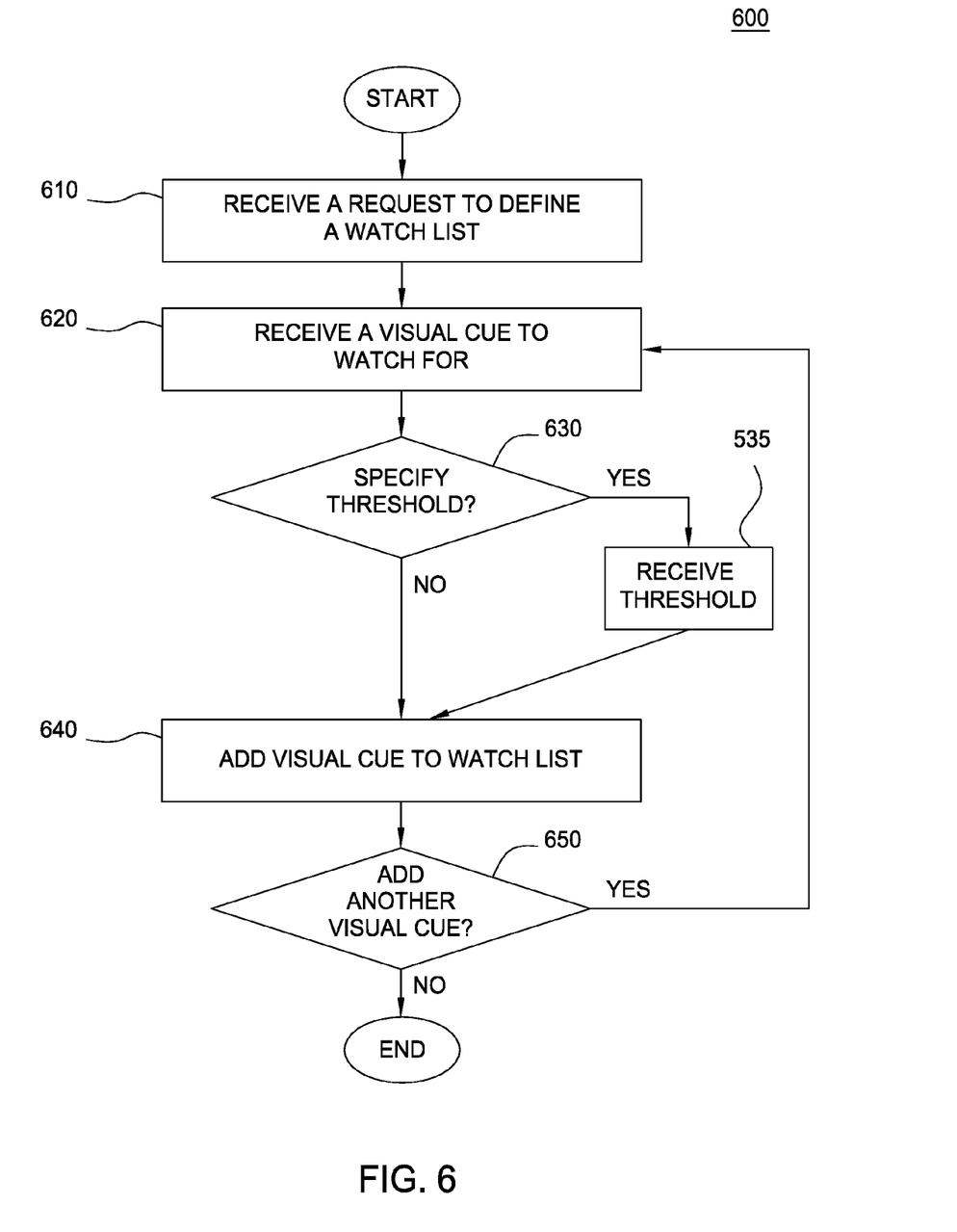
FIG. 6 is a flowchart depicting a method for defining a watch list, according to one embodiment of the invention.

FIG. 6 is a flowchart depicting a method 600 for defining a watch list, according to one embodiment of the invention. The steps of method 600 are described in conjunction with the watch list of Table III. Further, the watch list of Table III corresponds to the watch pane 338 of FIG. 3.

As shown, the method 600 begins at step 610, where the watch list manager 230 receives a request to define a watch list 116. For example, a user may input a specific keystroke (such as CTRL+W) for defining a watch list 116. At step 620, the watch list manager 230 receives a visual cue to be added to the watch list 116. For example, a user may specify that smiling by Starlight 310 should be added to the watch list 116. At step 630, the watch list manager 230 checks if the user wishes to specify a threshold. If so, the method 600 proceeds to step 635, where the watch list manager 230 receives a threshold from the user. For example, the user may specify that only smiles by Starlight exceeding five smiles should be presented to the user (i.e., the threshold is ">5 instances"). The user may select a visual cue from a predefined plurality of visual cues, according to one embodiment.

After step 630 or step 635, the method 600 proceeds to step 640, where the watch list manager 230 adds the visual cue to the watch list 116. For example, a new row representing the visual cue is added to the watch list in Table III. At step 650, the watch list manager 230 checks if the user wishes to add another visual cue to the watch list 116. If so, the method 600 proceeds to step 620; otherwise, the method 600 terminates. For example, a user may add another visual cue (e.g., Starlight frowning) and signal that the watch list 116 is finished by typing CTRL+W.

Figure 7:
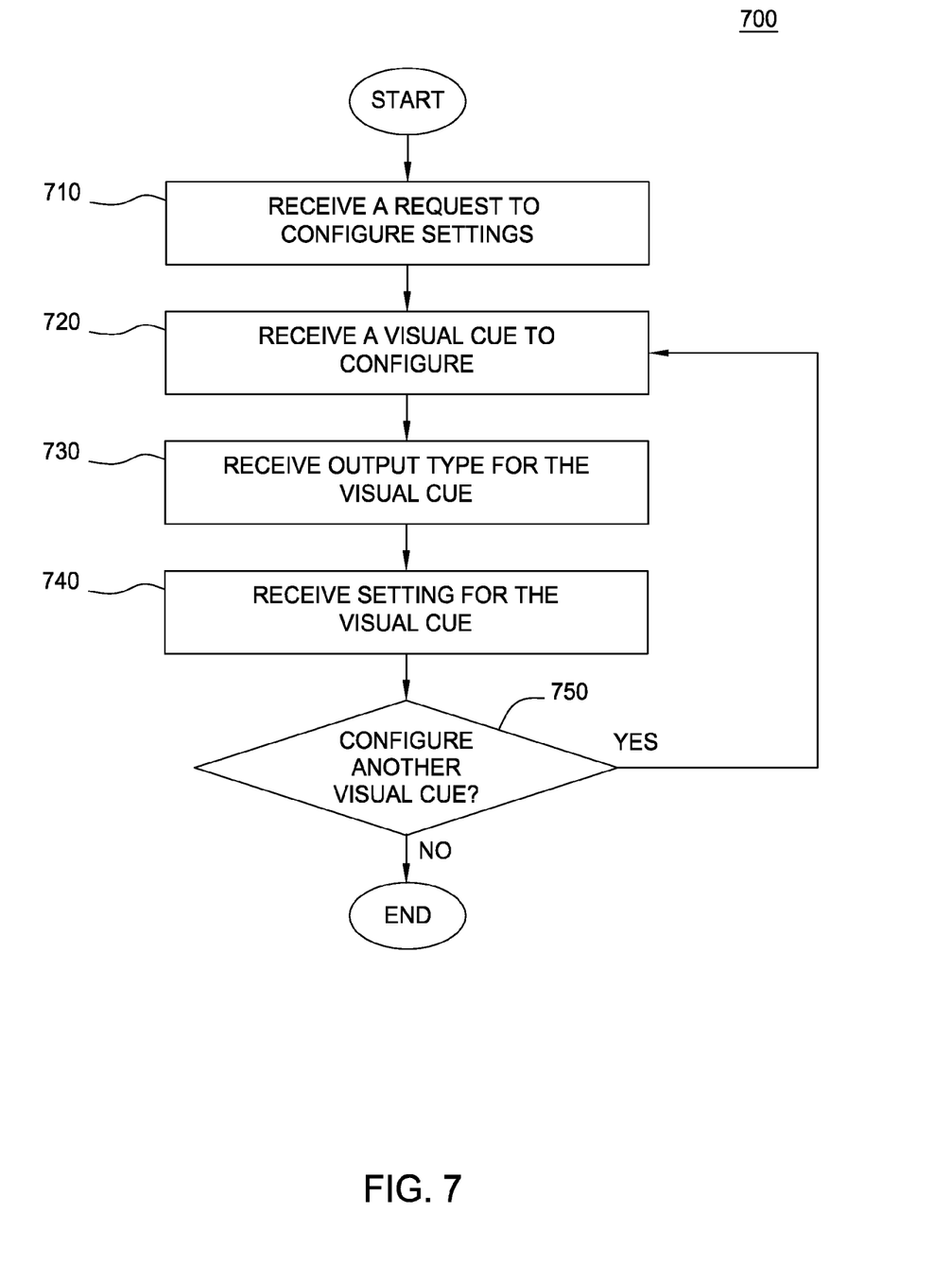
FIG. 7 is a flowchart depicting a method for configuring a setting, according to one embodiment of the invention.

FIG. 7 is a flowchart depicting a method 700 for configuring a setting, according to one embodiment of the invention. The steps of method 700 are described in conjunction with the settings of Table V.

As shown, the method 700 begins at step 710, where the settings manager 250 receives a user request to configure settings 118. For example, a user may input a specific keystroke (such as CTRL+N) for configuring the settings 118. At step 720, the settings manager 250 receives a visual cue to configure. From Table V, for example, the user may specify a visual cue of being "distracted." At step 730, the settings manager 250 receives an output type for the visual cue. For example, the user may specify an output type of "audio."

At step 740, the settings manager 250 receives a setting for the visual cue. Referring once again to Table V, the user may specify an output setting of "wind sound" instead of "frog croak." At step 750, the settings manager 250 checks whether the user wishes to configure another setting. If so, the method 700 proceeds to step 720; otherwise, the method 700 terminates. For example, the user may configure the output setting of "head shaking" to "flute sound" instead of "percussion sound," and signal that configuration is finished by typing CTRL+N. The user may select an output setting from a predefined plurality of output settings, according to one embodiment.

Of course, the embodiments described herein are intended to be illustrative and not limiting of the invention, and other embodiments are broadly contemplated. Those skilled in the art will recognize, for example, that embodiments of the invention may be adapted to support other visual cues, output types, and output settings than the visual cues, output types, and output settings described herein.

Advantageously, embodiments of the invention adapt a visual cue for output to a user via an output device, such as via audio, Braille, or text. A cursor cycle allows the user to specify an avatar of focus by cycling through avatars in group setting in a virtual world. Visual cues of the avatar of focus may be conveyed to the user. Further, the user may define a cursor mask to include specific avatars, such that the user may cycle through only the specific avatars of the cursor mask. Moreover, visual cues of the cursor mask or of all avatars may be summarized and presented to the user. The user may customize the visual cues and associated output types and output settings. Moreover, the user may specify a threshold for a visual cue. A visual cue that is detected to exceed the specified threshold may be presented to the user, regardless of the avatar of focus.

While the foregoing is directed to embodiments of the present invention, other and further embodiments of the invention may be devised without departing from the basic scope thereof, and the scope thereof is determined by the claims that follow.

What is claimed is:

1. A computer-implemented method, comprising:
by a virtual world application, conveying a visual cue to a user represented by a user avatar in a group setting in a virtual world, the group setting comprising a plurality of avatars, wherein conveying the visual cue comprises:
receiving settings for at least one visual cue, wherein the settings comprise a type of visual cue corresponding to an action that is performed by an avatar in the virtual world, a target cue format for expressing the visual cue, wherein the target cue format comprises at least one of tactile text and sound, wherein the virtual world application is configured to override a default sound with a specified sound, based on user input;
receiving a selection of a specified avatar in the group setting in the virtual world, wherein, the specified avatar is disposed within a predefined distance from the user avatar, wherein the predefined distance is determined based on a context associated with the user;
monitoring the specified avatar to detect the visual cue corresponding to an action that is performed by the specified avatar and is perceivable by sighted users, wherein the visual cue comprises one of an action of an avatar and inactivity of an avatar;
by operation of one or more computer processors, converting the visual cue into the target cue format, wherein the target cue format is perceivable by sight-impaired users; and
outputting the target cue format to an output device.

2. The computer-implemented method of claim 1, wherein receiving the selection of the specified avatar comprises receiving user input controlling a cursor cycle in which the user cycles through a plurality of avatars in the group setting.

3. The computer-implemented method of claim 1, further comprising:
receiving user input specifying a visual cue, and wherein the target cue format is output only when the detected action cue matches the specified visual cue.

4. The computer-implemented method of claim 1, wherein the output device is an audio device, and wherein the target cue format is output in a manner that is audible only to the user and not to any other user in the group setting.

5. The computer-implemented method of claim 1, wherein the output device is an audio device, and wherein the target cue format is output in a manner that is decipherable only to the user and not to any other user in the group setting.

6. The computer-implemented method of claim 1, further comprising:
presenting a summary of visual cues to a user in a group setting in a virtual world by:
receiving user input specifying a plurality of avatars in the group setting in the virtual world;
detecting visual cues that are performed by the specified plurality of avatars;
generating a summary of the detected visual cues based on user-specified summary preferences; and
outputting the summary to the output device.

7. The computer-implemented method of claim 6, wherein presenting the summary of visual cues further comprises:
receiving user input specifying a visual cue; and
receiving user input specifying a threshold for the specified visual cue;
wherein the summary is output only when the summary exceeds the threshold with respect to the specified visual cue.

8. The computer-implemented method of claim 6, wherein the summary is output only when the summary differs from an avatar outside the group setting with respect to a visual cue, and wherein presenting the summary of visual cues further comprises:
summarizing commonalities of the specified plurality of avatars to produce a second summary; and
outputting the second summary to the output device.

9. A computer-implemented method, comprising:
by a virtual world application, receiving user input specifying a visual cue to be monitored;

defining a cursor cycle that specifies a plurality of avatars in the virtual world;

providing a cursor that cycles through the plurality of avatars specified by the cursor cycle;

receiving user input that positions the cursor on an avatar in the cursor cycle, wherein, the specified avatar is disposed within a predefined distance from the user avatar, wherein the predefined distance is determined based on a context associated with the user;

detecting the presence of the specified visual cue being monitored, wherein the visual cue comprises one of an action of an avatar and inactivity of an avatar; and by operation of one or more computer processors, conveying the specified visual of the avatar to the user upon detection of the specified visual cue, wherein conveying the visual cue comprises converting the visual cue into a target cue format perceivable by sight-impaired users, wherein the target cue format comprises at least one of tactile text and sound and wherein the virtual world application is configured to override a default sound with the sound of the target cue format.

10. A computer readable storage medium containing a program which, when executed, performs an operation comprising:

conveying a visual cue to a user to a group setting in a virtual world, the group setting comprising a plurality of avatars, wherein conveying the visual cue comprises:

receiving, from a user, settings for at least one visual cue, wherein the settings comprise (i) a type of visual cue corresponding to an action that is performed by an avatar in the virtual world and (ii) a target cue format for expressing the visual cue, wherein the target cue format comprises at least one of tactile text and sound, wherein the program is configured to override the sound with a specified sound, based on user input;

receiving a selection of a specified avatar in the group setting in the virtual world, wherein the specified avatar is disposed within a predefined distance from the user avatar, wherein the predefined distance is determined based on a context associated with the user;

monitoring the specified avatar to detect the visual cue corresponding to an action that is performed by the specified avatar and is perceivable by sighted users, wherein the visual cue comprises one of an action of an avatar and inactivity of an avatar;

by operation of one or more computer processors when executing the program, converting the visual cue into the target cue format, wherein the target cue format is perceivable by sight-impaired users; and outputting the target cue format to an output device.

11. The computer readable storage medium of claim 10, wherein receiving the selection of the specified avatar comprises receiving user input controlling a cursor cycle in which the user cycles through a plurality of avatars in the group setting.

12. The computer readable storage medium of claim 10, wherein the operation further comprises:

receiving user input specifying a visual cue, and wherein the target cue format is output only when the detected action cue matches the specified visual cue.

13. The computer readable storage medium of claim 10, wherein the output device is an audio device, and wherein the target cue format is output in a manner that is audible only to the user and not to any other user in the group setting.

14. The computer readable storage medium of claim 10, wherein the output device is an audio device, and wherein the target cue format is output in a manner that is decipherable only to the user and not to any other user in the group setting.

15. A system, comprising:

a processor; and a memory containing a program, which when executed by the processor is configured to perform an operation for conveying a visual cue to a user in a group setting in a virtual world, the group setting comprising a plurality of avatars, the operation comprising:

receiving, from a user, settings for at least one visual cue, wherein the settings comprise a type of visual cue corresponding to an action that is performed by an avatar in the virtual world, a target cue format for expressing the visual cue, wherein the target cue format comprises at least one of tactile text and sound, wherein the program is configured to override the sound with a specified sound, based on user input;

receiving a selection of a specified avatar in the group setting in the virtual world, wherein the specified avatar is disposed within a predefined distance from the user avatar, wherein the predefined distance is determined based on a context associated with the user;

monitoring the specified avatar to detect the visual cue corresponding to an action that is performed by the specified avatar and is perceivable by sighted users, wherein the visual cue comprises one of an action of an avatar and inactivity of an avatar;

converting the visual cue into the target cue format, wherein the target cue format is perceivable by sight-impaired users; and outputting the target cue format to an output device.

16. The system of claim 15, wherein receiving the selection of the specified avatar comprises receiving user input controlling a cursor cycle in which the user cycles through a plurality of avatars in the group setting.

17. The system of claim 15, wherein the operation further comprises:

receiving user input specifying a visual cue, and wherein the target cue format is output only when the detected action cue matches the specified visual cue.

18. The system of claim 15, wherein the output device is an audio device, and wherein the target cue format is output in a manner that is audible only to the user and not to any other user in the group setting.

19. The system of claim 15, wherein the output device is an audio device, and wherein the target cue format is output in a manner that is decipherable only to the user and not to any other user in the group setting.

20. The computer-implemented method of claim 1, wherein the visual cue conveyed is determined based on a watch list specifying a set of user-defined visual cues to be monitored, wherein a visual cue is not conveyed if the visual cue was previously detected with respect to an avatar within a predefined time period and wherein information associated with an avatar of focus in the cursor cycle is conveyed to the user.

* * * * *